Nov. 10, 1953  C. H. GODDARD  2,658,311
METHOD OF PRODUCING GLASS PLAQUES
Filed Feb. 7, 1951
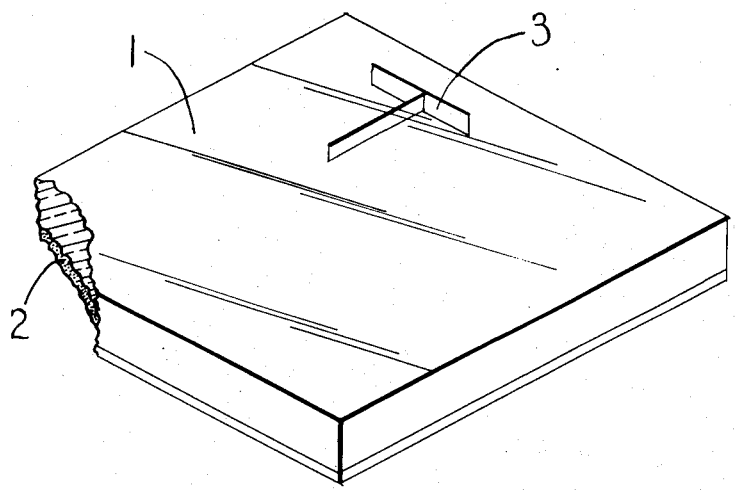
INVENTOR:
CHARLES H. GODDARD
BY
Lawrence Burns
ATTORNEY Patented Nov. 10, 1953

2,658,311

UNITED STATES PATENT OFFICE 2,658,311

METHOD OF PRODUCING GLASS PLAQUES

Charles H. Goddard, Newburyport, Mass.

Application February 7, 1951, Serial No. 209,789

1 Claim. (Cl. 49—79)

This invention relates to a glass plaque having a photographic image in depth therein, and to devices using such plaques.

The object of the invention is to produce a plaque which does not require a separate back reflector or refractor, but in which the reflector or the like is part of the plate itself.

This is accomplished by putting a diffusely reflecting ceramic coating on the back of the plate, to reflect back through the glass any light transmitted through the glass.

Other objects, advantages and features of this invention will be apparent from the following specification, taken in connection with the accompanying figure which shows a specific embodiment of the invention.

In the figure, the glass plate 1 has the image 3 photographically set therein, and the ceramic reflecting coating 2 on the back of plate 1. Thus when the plate is viewed from above the light coming from above passes through the plate to the ceramic coating 2, and is then reflected back again through the plate, giving the illusion of a plate illuminated from its back by transmitted light, with the illusion modified by the original reflection from the glass at the first surface. The ceramic coating should be light enough in color to reflect as much of the incident light as possible.

Of course, if it is actually desired to illuminate the plate from the back, the ceramic coating can be made thin enough to be sufficiently translucent to transmit light from the back.

To produce the ceramic reflecting coating the glass can be first coated on the desired side with, for example, 96 parts by weight of ground glass frit and 4 parts by weight of titanium dioxide pigment, nine parts of this by weight being suspended in 48 parts by weight of 91% isopropanol and 9% water. One-tenth part of polyoxyethylene sorbitan monolaurate is added to the suspension. Other mixtures and suspending media may be used.

The ground glass frit should be of a glass which can be sealed to that of the plate, but should melt at a somewhat lower temperature. A mixture of lead silicate and lead borosilicate will generally be satisfactory.

The coating can be flowed onto or otherwise applied after the plate 1 is irradiated or exposed and before the plate 1 is heated. To develop the latent image, the glass can be heated to about its softening point, as shown in United States Patents 2,326,012 and 2,422,472 to Robert H. Dalton, for example, and this temperature will be sufficient to melt the glass frit and produce the ceramic coating.

The photographic glass can be the copper-containing glass of the Dalton patents, for example, and the latent image in it may be formed by applying a light image to the plate 1, either by means of an optical system or by placing a photographic negative of the usual type in contact with the plate and irradiating through it with a proper source of light. Although I have used the word "light" for convenience, the "light" used for exposing the glass is really ultraviolet light and not visible light.

If the exposure is made such that the image penetrates different distances into the plate for different light densities, the ceramic coating can be put on the side of the plate having the greater photographic density, to give a very beautiful and somewhat three-dimensional effect.

What I claim is:

The method of producing a photographic plaque, which method comprises: irradiating a plate of photographic glass with an ultraviolet image to produce a latent image therein; applying a powdered ceramic coating to one side of said plate; and then baking the glass to develop the latent image, and to harden the ceramic coating to seal it to the glass.

CHARLES H. GODDARD.

References Cited in the file of this patent

UNITED STATES PATENTS

| Number | Name | Date |
|---|---|---|
| 2,194,611 | Paddock et al. | Mar. 26, 1940 |
| 2,326,012 | Dalton | Aug. 3, 1943 |